United States Patent [19]

Meki et al.

[11] 4,166,250

[45] Aug. 28, 1979

[54] SYNCHRONIZING SIGNAL PROCESSING CIRCUIT

[75] Inventors: Norio Meki, Takatsuki; Tadashi Yoshino, Hirakata, both of Japan

[73] Assignee: Matsushita Electric Industrial Co., Ltd., Osaka, Japan

[21] Appl. No.: 842,880

[22] Filed: Oct. 17, 1977

[30] Foreign Application Priority Data

Oct. 19, 1976 [JP] Japan .................. 51-125760

[51] Int. Cl.² ............ H04N 5/08; H03K 5/00
[52] U.S. Cl. ........................ 328/165; 358/158
[58] Field of Search .................. 328/165; 358/158

[56] References Cited

U.S. PATENT DOCUMENTS

| | | | |
|---|---|---|---|
| 3,593,162 | 7/1971 | Patmore | 328/165 X |
| 3,688,037 | 8/1972 | Ipri | 358/158 |
| 3,991,270 | 11/1976 | van Straaten et al. | 358/158 |
| 4,025,952 | 5/1977 | Eckenbrecht | 358/158 |
| 4,070,631 | 1/1978 | Nash et al. | 328/165 |

*Primary Examiner*—John S. Heyman
*Attorney, Agent, or Firm*—Stevens, Davis, Miller & Mosher

[57] ABSTRACT

A synchronizing signal processing digital circuit adapted for integrated circuit manufacture for blanking equalization pulses from an input composite synchronization signal to obtain a synchronized horizontal-signal therefrom, which comprises D-type flip-flop having a clock input terminal to receive the composite sync signal and a D-input terminal to receive the composite sync signal and a D-input terminal fixed to a high level, a counter for counting input clock pulses of a frequency higher than that of the horizontal sync signal and applying a first pulse by counting a predetermined number of the clock pulses to a reset terminal of the D-type flip-flop, and a pulse generation circuit for applying a second pulse signal to set the counter in response to input clock pulse, whereby the synchronized signal free from the equalization pulses of the composite signal is produced with the output signal of the D-type flip-flop.

5 Claims, 7 Drawing Figures

SYNCHRONIZING SIGNAL PROCESSING CIRCUIT

FIELD OF THE INVENTION

The present invention relates to a synchronizing signal processing circuit adapted for use in an integrated circuit structure.

DESCRIPTION OF THE PRIOR ART

Figure 1:
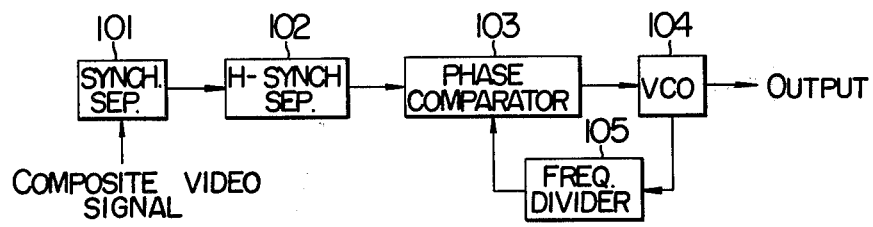
FIG. 1 shows a block diagram of a conventional AFC citcuit.

As shown in FIG. 1, in a conventional AFC circuit, a composite sync. signal is separated from a composite video signal by a composite sync. signal separation circuit 101, and a horizontal sync. signal portion is separated from the composite sync. signal by a horizontal sync. signal separation circuit 102, and the separated horizontal sync. signal is used as a sampling pulse comparator 103 to form a stable AFC loop together with a voltage controlled oscillator 104 and a frequency divider 105. A circuit configuration which has been used to separate the horizontal synch. signal from the composite sync. signal is shown in FIG. 2, in which two monostable multivibrators are used, one of which, i.e. the multivibrator 1 functions to eliminate equalization pulse portions of the composite synch. signal (shown in FIG. 2(b) in which a dashed line shows the equalization pulses) applied to a terminal A while the other, i.e. monostable multivibrator 2 functions to provide a pulse of a constant duration, which in turn is provided to an output terminal D as the horizontal sync. signal (FIG. 2(e)).

Figure 2:
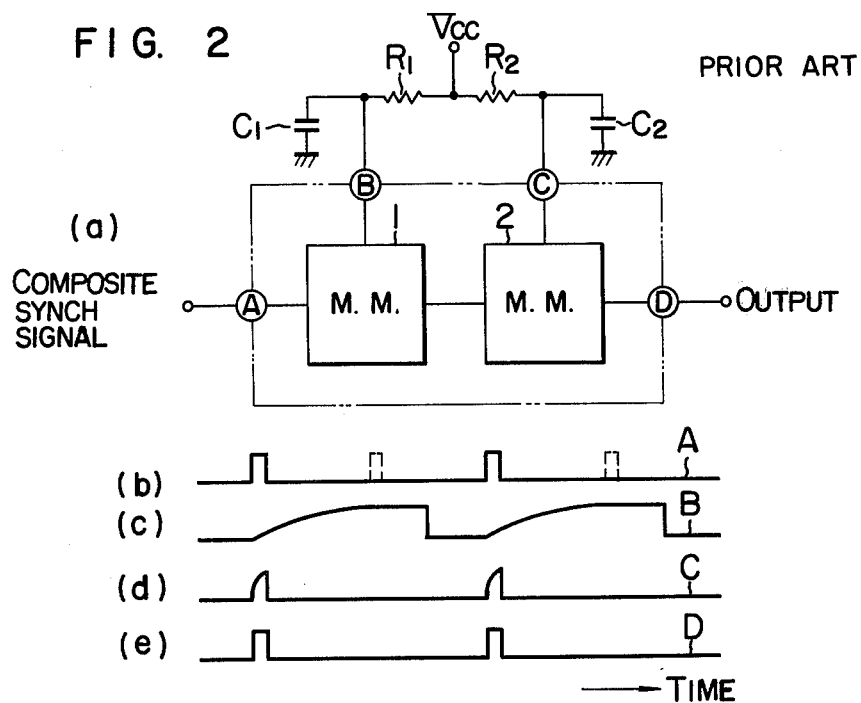
FIG. 2(a) shows a wiring diagram of one example of a prior art horizontal synchronizing signal processing circuit.
FIGS. 2(b)-(e) show waveforms at various points A to D of the circuit.

In the circuit configuration shown in FIG. 2 for separating the horizontal sync. signal from the composite sync. signal, two monostable multivibrator circuits are required. When the circuit is fabricated in an integrated circuit structure, an increased number of terminal pins are required because the time constant circuit includes a capacitor. Furthermore, an off-chip resistor and capacitor of the time constant circuit is required, and the resultant pulse width is highly sensitive to the temperature dependency of the resistor and the capacitor.

SUMMARY OF THE INVENTION

It is an object of the present invention to overcome the above drawbacks of the prior art by constructing the first monostable multivibrator in the prior art circuit for eliminating the equalization pulses by a digital circuit which does not require a time constant circuit.

More particularly, the circuit of the present invention is constructed such that the composite sync. signal received within the period $T=m/f_c$ is eliminated, where $f_c$ is a clock input signal frequency which is higher than the horizontal sync. signal frequency $f_H$ ($=15.75$ kHz) and T is time elapsed before the m-th clock input signal has been received. During the equalization pulse period and the vertical sync. signal period, the signal is received at every H/2 period, where H is one horizontal signal period which is approximately equal to 63.5 μsec. Therefore, the time T should be selected to meet $31.75$ μsec.$<T<63.5$ μsec.

According to the present invention, the monostable multivibrator which has been used in the prior art to eliminate the equalization pulses from the composite sync. signal becomes necessary. An output signal of a reference oscillator or a voltage controlled oscillator constituting the AFC circuit is used as the clock input signal in order to process the signal in the digital circuit. In this manner, the time constant circuit comprising the C-R components is eliminated and the circuit configuration which has reduced number of terminals and hence is adapted for use in the integrated circuit structure is attained.

DESCRIPTION OF THE PREFERRED EMBODIMENTS

The present invention will now be explained in detail in conjunction with the preferred embodiments shown in FIGS. 3 to 7.

Figure 3:
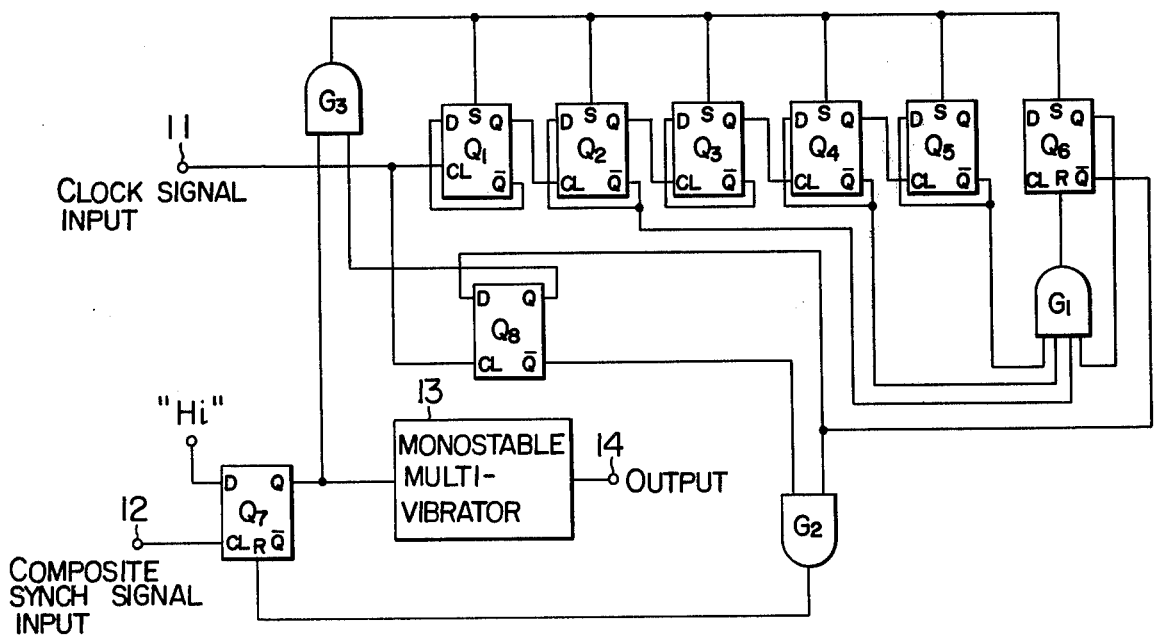
FIG. 3 shows a block diagram of a synchronizing signal processing circuit in accordance with one embodiment of the present invention.

In the embodiment shown in FIG. 3, numeral 11 denotes an input terminal for a clock signal having a frequency $f_c=40\,f_H$. The clock signal may be derived from the voltage controlled oscillator 104 shown in FIG. 1. Numeral 12 denotes a composite sync. signal input terminal to which the output of the sync. signal separation circuit 101 shown in FIG. 1 is applied. $Q_1$–$Q_8$ denote D-type flip-flops, of which $Q_1$–$Q_5$ constitute a counter. $G_1$ denotes a four-input AND gate which receives an inverted output $\overline{Q}_2$ of the flip-flop $Q_2$, an inverted output $\overline{Q}_4$ of the flip-flop $Q_4$, an inverted output $\overline{Q}_5$ of the flip-flop $Q_5$, and an inverted output $\overline{Q}_6$ of the flip-flop $Q_6$, $G_2$, $G_3$ denote two-input AND gates, numeral 13 denotes a monostable multivibrator, and numeral 14 denotes an output terminal which is connected to the phase comparator 103 in FIG. 1.

As is well known, the output of the D-type flip-flop changes from low level to high level in response to a clock signal received when the D-terminal is at high level, and maintains the high level output if the clock signal is received when the output is at high level. Thus, the $Q_1$–$Q_5$ operate as the counter when they are connected in a manner shown in FIG. 3, and the output mode of the $Q_1$–$Q_5$ changes in a manner shown in FIG. 4 in response to the clock signal. When the set input to the flip-flops $Q_1$–$Q_6$ is reset by a first pulse applied to the clock signal input terminal 11 and a 27th pulse is subsequently applied to the clock input terminal 11 of the flip-flop $Q_1$, the outputs $\overline{Q}_2$, $\overline{Q}_4$, $\overline{Q}_5$ and $Q_6$ are high to activate the four-input AND gate $G_1$ so that the $Q_6$ is reset to provide the high level at $\overline{Q}_6$. With the $\overline{Q}_6$ being high level, the AND gate $G_2$ is activated since the $\overline{Q}_8$ is at high level so that the $Q_7$ is reset. Since the $\overline{Q}_6$ is also connected to the D-input terminal of the $Q_8$, the $\overline{Q}_8$ is reversed to low level at the 28th pulse so that the reset of the $Q_7$ is released about 1.6 μsec ($=63.5/40$ μsec) later. When the composite sync signal input applied to the clock input terminal 12 of the $Q_7$ then changes from low level to high level, the $Q_7$ is reversed from low level to high level so that both $Q_7$ and $Q_8$ are at high level. Thus, the AND gate $G_3$ is activated to set the $Q_1$-$Q_6$. With the $Q_6$ being set, the $\overline{Q}_6$ changes to low level by the clock input to the $Q_8$ which appears immediately after the $\overline{Q}_6$ has changed from low to high level. within about 1.6 μsec.

Figure 4:
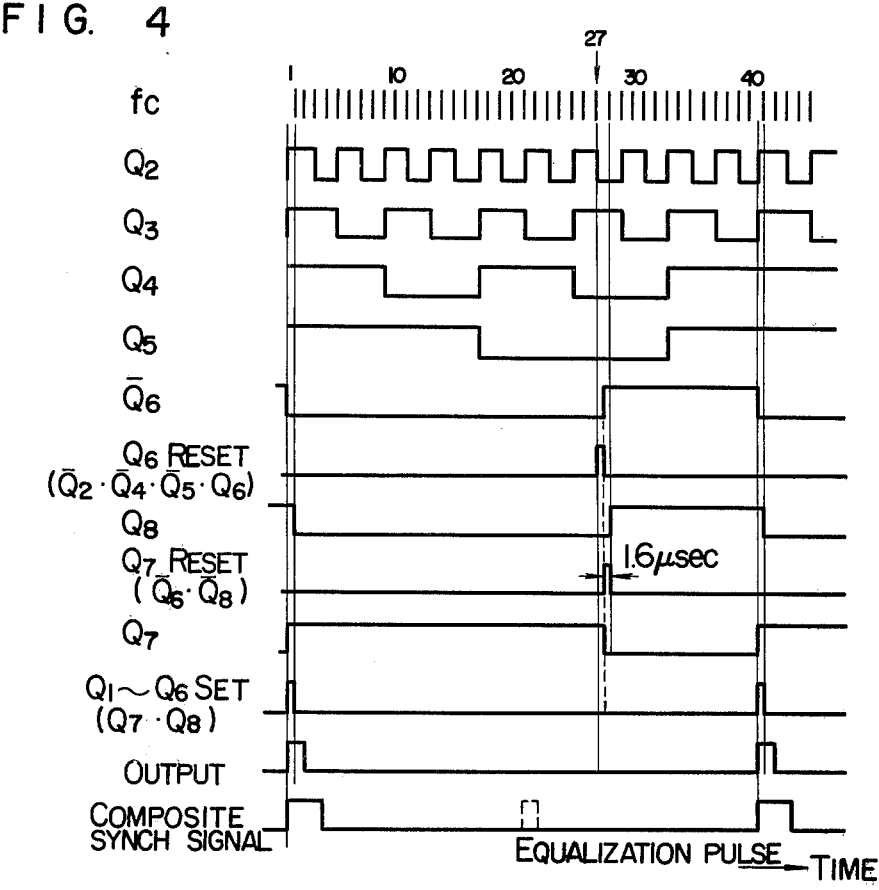
FIG. 4 shows a timing chart for explaining the operation of FIG. 3.

Through the above steps, a signal which rises at the rise of the horizontal sync. signal and lasts for about 42.5 μsec (=27/40 $f_H$) appears at the flip-flop $Q_7$, as shown in FIG. 4. In this manner, the equalization pulses included in the composite sync. signal applied to the terminal 12 are removed.

Let us consider the stability of the duration of the output pulse at the flip-flop $Q_7$. If the clock frequency $f_c$ applied to the clock signal input terminal 11 is stable, the variation $\Delta T$ of the duration is within $1/f_c$ (=1.58 μsec). Thus, it may be said that the higher the frequency $f_c$ is, the more stable is the pulse duration of the $Q_7$. When the clock input signal to the $Q_1$ in FIG. 3 is derived from the output of the voltage controlled oscillator 104 constituting the AFC circuit shown in FIG. 1, the equalization pulses can be removed to an extent to pose no practical problem by controlling the upper and lower limits of the oscillation frequency such that the time T meets the relation 31.75 μs<T<63.5 μs.

The pulse of the flip-flop $Q_7$ thus produced is applied to the monostable multivibrator 13 to produce a pulse of a constant duration (about 2–5 μs) at the output terminal 14 in response to the rise of the pulse of the $Q_7$. Since the pulse at the output terminal 14 is derived from the composite sync. signal applied to the terminal 14 and free from the equalization pulses, the pulse at the terminal 14 may be used as the sampling pulse to form a stable AFC loop.

Figure 5:
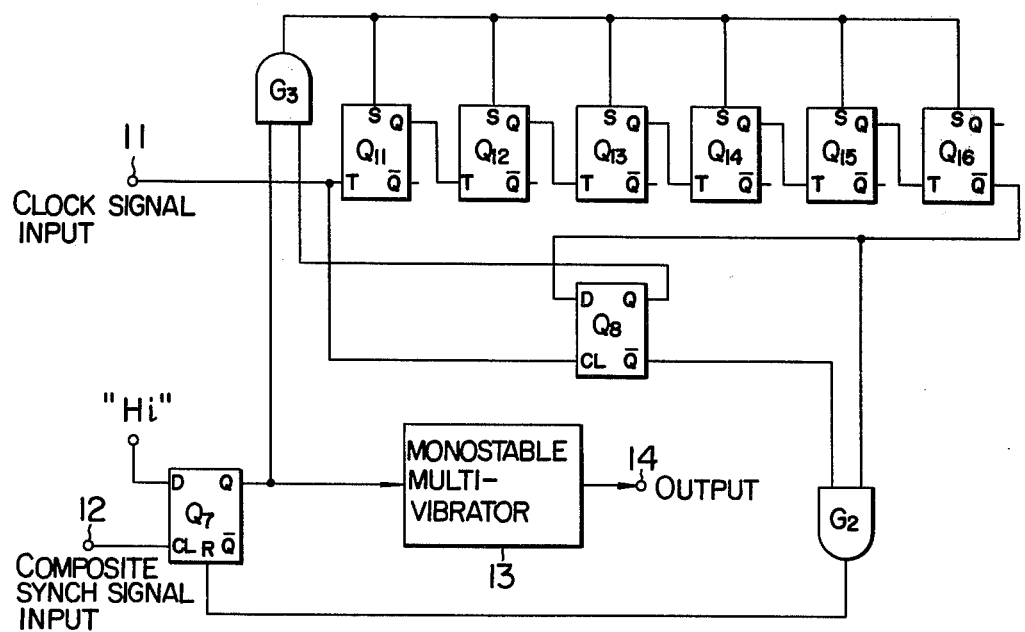
FIG. 5 shows a block diagram of another embodiment of the present invention.

FIG. 5 shows another embodiment of the present invention, in which numerals 11–14, and $G_2$, $G_3$, $Q_7$, $Q_8$ are identical to those shown in FIG. 3 and have the same functions. $Q_{11}$-$Q_{16}$ denote T-type flip-flops. When the 32nd clock pulse as counted from the release of the set input by the AND gate $G_3$ is applied to the clock signal input terminal 11, the $\overline{Q}_{16}$ is reversed from a low to a high level so that the AND gate $G_2$ is activated to reset the $Q_7$. Thus, a pulse which rises at the rise of the horizontal sync. signal and lasts for about 52.3 μsec (=33/40 $f_H$) is produced at the output of the $Q_7$. In this manner, the equalization pulses are removed as in the embodiment of FIG. 3.

By establishing the pulse duration of the $Q_7$ broad enough to be close to 1H (about 63.5 μsec) as in the embodiment of FIG. 5, spurious pulses which may occur in the composite sync. signal by the dropout or the like during signal playback in a magnetic recording and reproducing system such as VTR can be removed for at least the duration of the pulse of the $Q_7$. Therefore, the probability of the AFC circuit being disturbed by the spurious pulse is reduced.

Figure 6:
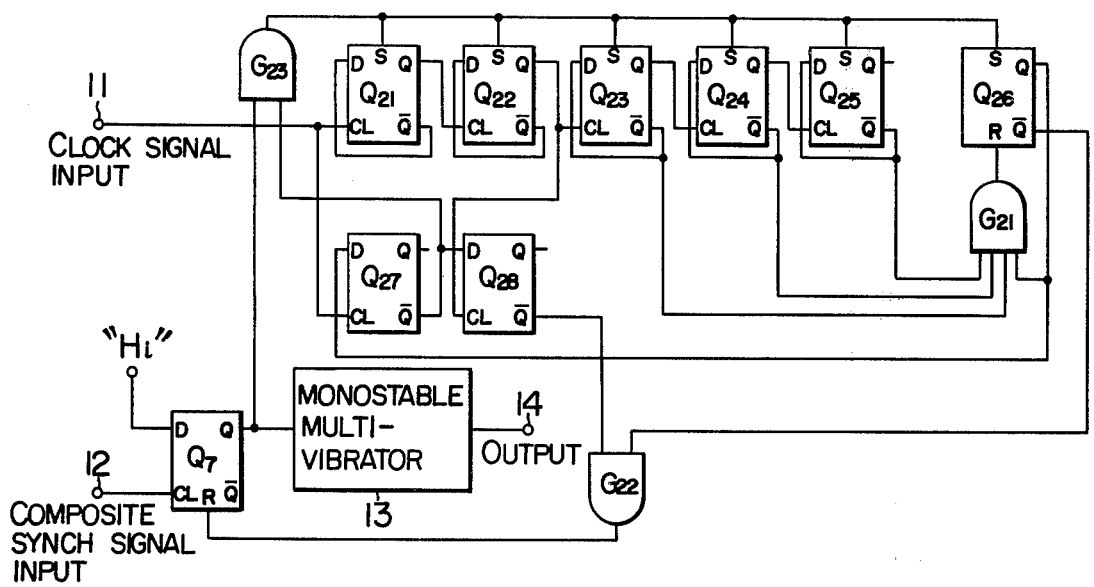
FIG. 6 shows a block diagram of a further embodiment.
Figure 7:
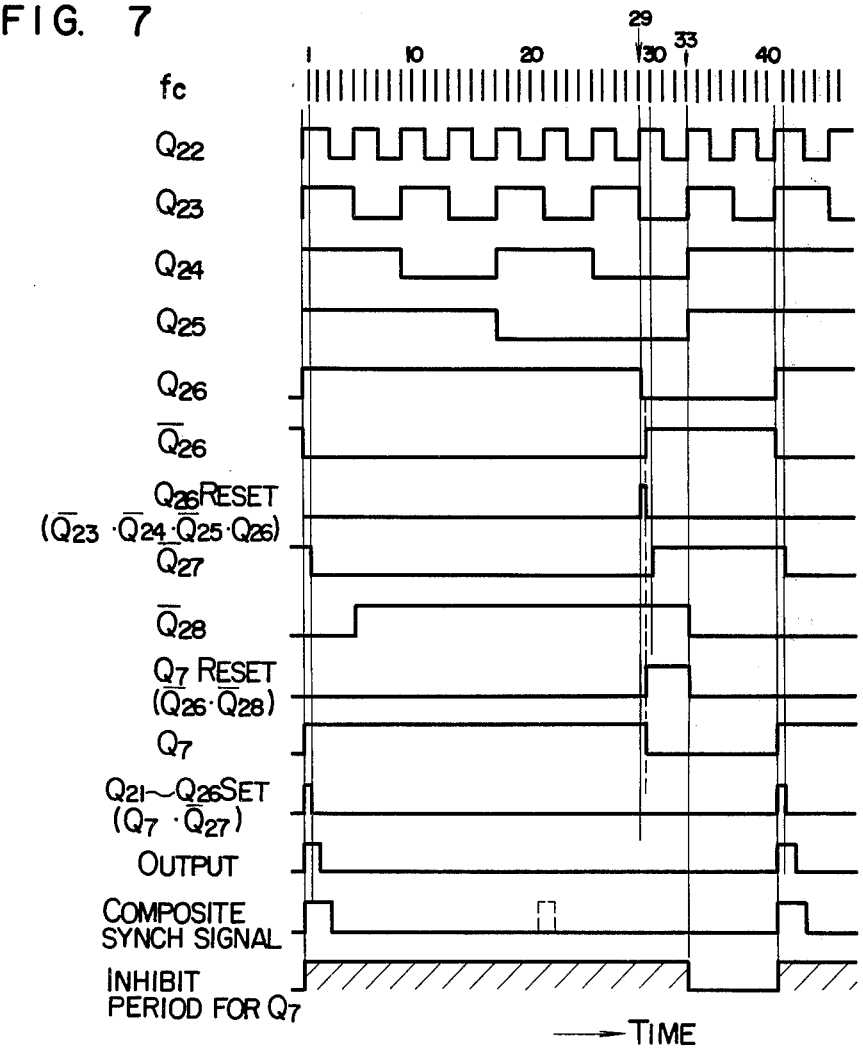
FIG. 7 shows a timing chart for explaining the operation of FIG. 6.

FIG. 6 shows another embodiment of the present invention, in which numerals 11–14 and $Q_7$ are identical to those shown in FIG. 3 and have the same functions. The operation of FIG. 6 is now explained with reference to a time chart shown in FIG. 7. $Q_{21}$-$Q_{28}$ denote D-type flip-flops. When the set input by the AND gate $G_{23}$ is released by a first clock input signal and a 29th clock is subsequently applied to the clock signal input terminal 11 of the $Q_{21}$, the four-input AND gate $G_{21}$ is activated to reset the $Q_{26}$ so that the $\overline{Q}_{26}$ is reversed from low to high level. With the $\overline{Q}_{26}$ being at high level, the AND gate $G_{22}$ ($\overline{Q}_{26}$·$\overline{Q}_{28}$) is activated to reset the $Q_7$. On the other hand, since the $Q_{26}$ is connected to the D-input terminal of the $Q_{27}$, the $\overline{Q}_{27}$ is reversed from low to high level at the 30th clock signal input, and the D-type flip-flop $Q_{28}$ which receives the $\overline{Q}_{27}$ at the D-input terminal thereof and the $Q_{22}$ as the clock input signal is reversed at the 33rd clock input signal so that $\overline{Q}_{28}$ is reversed from high to low level. As a result, the reset pulse to the $Q_7$ is released about 6.3 μsec (=63.5/40×4 μsec) later. When the composite synch. signal input applied to the clock input terminal 12 of the $Q_7$ then changes from low to high level, the $Q_7$ is reversed from low to high level so that the AND gate $G_{23}$ ($Q_7$·$\overline{Q}_{27}$) is activated to set the $Q_{21}$-$Q_{26}$. With the $Q_{26}$ being set, the $Q_{26}$ is reversed from low to high level and the $\overline{Q}_{27}$ is reversed from high to low level by the clock input signal to the $Q_{27}$ which is applied immediately after the $Q_{26}$ has been reversed from low to high level. Therefore, the set input to the $Q_{21}$-$Q_{26}$ is removed within the 1.6 ∞sec. Through the above steps, a signal which rises at the rise of the horizontal sync. signal and lasts for about 46 μsec (=29/40 $f_H$) is produced at the output of the $Q_7$ as shown in FIG. 7, and a reset pulse which lasts for about 6.3 μsec from the fall of the $Q_7$ output is supplied to the reset terminal of the $Q_7$. Therefore, the signal applied to the terminal 12 does not activate the $Q_7$ during the period of about 52.3 μsec (=46 μs+6.3 μs) from the rise of the composite sync. signal. In this manner, the same effect as in the embodiment of FIG. 5 is attained.

As described hereinabove, the present invention provides the circuit configuration which does not require the time constant circuit comprising the C-R components and has a reduced number of terminals and hence is adapted for use in the integrated circuit structure, by removing the monostable multivibrator which has been used in the prior art as means for eliminating the equalization pulses from the composite sync. signal and using the output signal of the reference oscillator or the voltage controlled oscillator constituting the AFC circuit as the clock input signal to process the signal in the digital circuit.

What is claimed is:

1. A synchronizing signal processing circuit for a composite synchronizing signal including a horizontal synchronizing signal and equalization pulses, said circuit producing a signal in synchronism with the composite horizontal synchronizing signal and having no equalization pulses comprising:

a first D-type flip-flop having a clock input terminal for receiving said composite synchronizing signal, a D-input terminal which is fixed to a high level, a reset input terminal, and an output terminal for supplying an output signal;

a first pulse generation means, which is driven by a clock pulse signal having a frequency higher than the frequency of the horizontal synchronizing signal, said pulse generation means including a counter for producing a first pulse when an m-th clock pulse of said clock pulse signal is produced, m being a preselected positive integer;

means for applying said first pulse to said reset input terminal of said first D-type flip-flop;

a second pulse genreation means for producing a second pulse in response to the coincidence of the output signal of said first D-type flip-flop and the clock pulse signal;

means for setting said counter in said first pulse generation means by said second pulse; and means for providing in response to said output signal of said first flip-flop a signal in synchronism with said horizontal synchronizing signal and free from the equalization pulses included in said composite synchronizing signal.

2. A synchronizing signal processing circuit according to claim 1 wherein said clock pulse signal which drives said first pulse generation means has a frequency equal to $n.f_H$, where $f_H$ is the frequency of the horizontal synchronizing signal and n is a positive integer.

3. A synchronizing signal processing circuit according to claim 2 wherein said first pulse generation means includes a flip-flop means which receives said signal of the frequency $n.f_H$ as the clock input signal and the output of which is reversed at the m-th clock pulse of said clock input signal, a second D-type flip-flop having a D-input terminal to which the output signal of said flip-flop means is applied and a clock input terminal to which said signal of the frequency $n.f_H$ is applied, and an AND gate which receives the output signal of said flip-flop means and the $\overline{Q}$ output signal of said second D-type flip-flop.

4. A synchronizing signal processing circuit according to claim 3 wherein said second pulse generation means includes an AND gate which receives the output signal of said first D-type flip-flop and the $\overline{Q}$ output signal of said second D-type flip-flop.

5. A synchronizing pulse processing circuit according to claim 2, wherein said first pulse generation means includes a flip-flop means which receives said signal of the frequency $n.f_H$ as the clock input signal and the output of which is reversed at the k-th clock signal of said clock input signal, k being a positive integer, a third D-type flip-flop having a D-input terminal to which the output signal of said flip-flop means is applied and a clock input terminal to which said signal of the frequency $n.f_H$ is applied, a fourth D-type flip-flop having a D-input terminal to which the output signal of said third D-type flip-flop is applied and a clock input terminal to which said signal of the frequency $n.f_H$ divided by j is applied, j being a positive integer, and an AND gate which receives the output signal of said flip-flop and the $\overline{Q}$ output signal of said fourth D-type flip-flop.

* * * * *